US008354164B2

(12) United States Patent
Nozaki et al.

(10) Patent No.: US 8,354,164 B2

(45) Date of Patent: Jan. 15, 2013

(54) SEMICONDUCTIVE MEMBER, AND DEVELOPING ROLL, CHARGING ROLL, TRANSFER BELT, AND IMAGE FORMING APPARATUS USING SAME

(75) Inventors: Chiyoshi Nozaki, Otsu (JP); Tetsumaru Fujita, Nishinomiya (JP); Shintaro Yamada, Ikeda (JP); Yuji Nagatomo, Minoo (JP); Shin Murayama, Sanda (JP); Manabu Hamada, Ikeda (JP); Yoshimichi Ishikawa, Itami (JP)

(73) Assignee: Ricoh Company, Limited, Tokyo (JP)

( * ) Notice: Subject to any disclaimer, the term of this patent is extended or adjusted under 35 U.S.C. 154(b) by 456 days.

(21) Appl. No.: 12/622,692

(22) Filed: Nov. 20, 2009

(65) Prior Publication Data

US 2010/0150609 A1 Jun. 17, 2010

(30) Foreign Application Priority Data

Dec. 12, 2008 (JP) ................................ 2008-316796

(51) Int. Cl.

*B32B 5/16* (2006.01)

*G03G 15/00* (2006.01)

(52) U.S. Cl. ....................................... 428/323; 399/159

(58) Field of Classification Search ........................ None

See application file for complete search history.

(56) References Cited

U.S. PATENT DOCUMENTS

2007/0107225 A1 5/2007 Kim

FOREIGN PATENT DOCUMENTS

| | | | |
|---|---|---|---|
| EP | 0 385 462 | A2 | 9/1990 |
| EP | 0 385 462 | A3 | 9/1990 |
| EP | 1 498 787 | A2 | 1/2005 |
| EP | 1 498 787 | A3 | 1/2005 |
| JP | 63-14017 | | 3/1988 |
| JP | 2743271 | | 2/1998 |
| JP | 3007210 | | 11/1999 |
| JP | 2004-341511 | | 12/2004 |
| JP | 2007-63569 | | 3/2007 |

*Primary Examiner* — Sheeba Ahmed

(74) *Attorney, Agent, or Firm* — Oblon, Spivak, McClelland, Maier & Neustadt, L.L.P.

(57) ABSTRACT

A semiconductive member including an alkali metal salt having the formula $(M)_n.X$ in a surface layer thereof. M represents $Na^+$, $K^+$, or $Li^+$; X represents $Cl^-$, $Br^-$, $I^-$, $F^-$, $CH_3COO^-$, $CF_3COO^-$, $CH(COOH)CHCOO^-$, $(CHCOO^-)_2$, $CH_2(COOH)CH_2COO^-$, $(CH_2COO^-)_2$, $(HOOC)Ar(COO^-)$, $Ar(COO^-)_2$, $(HOOC)_2Ar(COO^-)$, $(HOOC)Ar(COO^-)_2$, $Ar(COO^-)_3$, $(HOOC)_3Ar(COO^-)$, $(HOOC)_2Ar(COO^-)_2$, $(HOOC)Ar(COO^-)_3$, $Ar(COO^-)_4$, $Ar—SO_3^-$, $Ar(SO_3^-)_2$, an oligomer or a polymer having an acrylic acid anion unit, or an oligomer or a polymer having an methacrylic acid anion unit; Ar represents a benzene ring, a naphthalene ring, or a biphenyl ring; and n is a numeral equivalent to the anionic valence of X.

4 Claims, 2 Drawing Sheets

SEMICONDUCTIVE MEMBER, AND DEVELOPING ROLL, CHARGING ROLL, TRANSFER BELT, AND IMAGE FORMING APPARATUS USING SAME

BACKGROUND OF THE INVENTION

1. Field of the Invention

The present invention relates to a semiconductive member, and a developing roll, a charging roll, and a transfer belt using the semiconductive member. The present invention also relates to an image forming apparatus using the developing roll, the charging roll, or the transfer belt.

2. Discussion of the Background

In the field of electric and electronic devices, resin materials which can precisely control static electricity have been demanded. For example, electrophotographic image forming apparatuses, such as copiers, facsimiles, and laser beam printers, form images through various processes including charging, irradiation, development, transfer, fixing, cleaning, and neutralization. Each of these processes requires precise control of static electricity.

In the charging process, a surface of a photoreceptor is evenly charged. In the irradiation process, an electrostatic latent image is formed on the charged surface of the photoreceptor by irradiation of light. In the development process, the electrostatic latent image is developed into a toner image that is visible. In the transfer process, the toner image is transferred from the photoreceptor onto a transfer material such as paper. In the fixing process, the toner image is fused on the transfer material by application of heat and pressure. In the cleaning process, residual toner particles remaining on the photoreceptor are removed. In the neutralization process, the charged photoreceptor is neutralized.

An electrophotographic image forming apparatus is typically equipped with a charging roll or belt, a developing roll, a toner layer thickness controlling blade, and a transfer belt. These members are required to have a semiconductive surface layer, more specifically a surface layer which has a volume resistivity of from $10^7$ to $10^{11}$ $\Omega \cdot m$. For example, the charging roll, to which a voltage is applied, directly provides a photoreceptor with charge by direct contact with the photoreceptor. The developing roll frictions a toner supply roll so that toner particles are charged and the charged toner particles are adhered to a surface of the developing roll. The toner layer thickness controlling blade evens out the adhered toner particles on the developing roll. The toner particles fly to an electrostatic latent image on a surface of the photoreceptor by electric attraction force. The transfer belt is applied with a voltage having the opposite polarity to the toner particles so that an electric field is generated. The toner particles are transferred from the photoreceptor onto a transfer material by electrostatic force of the electric field.

As described above, various members in image forming apparatuses are required to have semiconductivity with an appropriately low volume resistivity. It is preferable that the volume resistivity is even at any point within a member. If the volume resistivity differs locally, high quality images cannot be produced. For example, if the volume resistivity distribution is uneven within a charging roll, a photoreceptor cannot be evenly charged, resulting in poor image quality.

A high voltage is repeatedly applied to the above members. Therefore, if the volume resistivity considerably varies upon application of a high voltage, high quality images cannot be produced reliably. Similarly, if the volume resistivity considerably varies upon variation in temperature and/or humidity, high quality images cannot be produced reliably. It may be possible to avoid effect of variation in temperature by warming up the apparatus, but it may be difficult to avoid effect of variation in humidity.

Various approaches have been proposed to control electric resistivity of polymer materials and moldings thereof. For example, one approach involves (1) applying an organic antistatic agent to the surface of a molding. Another approach involves (2) kneading an organic antistatic agent into a polymer material. Yet another approach involves (3) kneading a conductive filler such as a carbon black and a metal powder into a polymer material. Yet another approach involves (4) kneading an electrolyte in a polymer material.

However, the approach (1) has a disadvantage that the antistatic agent is likely to release when the surface of the molding is wiped or washed, resulting in short-term antistatic effect. In the approach (2), the organic antistatic agent is typically a surfactant or a hydrophilic resin. When a surfactant is used, electric resistivity and antistatic performance considerably vary upon variation in temperature and/or humidity because antistatic effect is provided by bleeding of the surfactant from the surface of a molding. When an antistatic agent is used, a large amount thereof is required to provide desired antistatic effect, which is likely to suppress good natures of polymers. In addition, there is a disadvantage that electric resistivity and antistatic performance considerably depend on humidity.

The approach (3) has been employed in various fields. For example, a typical charging roll is comprised of a cored bar which is covered with a semiconductive polymer composite material which is a polymer material into which a conductive filler is kneaded. However, such a semiconductive polymer composite material, which is a polymer material into which a conductive filler is kneaded, has a disadvantage that the volume resistivity distribution is very uneven. The degree of variation in volume resistivity is too large to put it into practical use. Additionally, such a semiconductive polymer composite material has another disadvantage that the withstand voltage is so low that it is not always suitable for intentional use such that high voltage is repeatedly applied. To achieve desired semiconductive level, a large amount of a conductive filler is required, which is likely to degrade molding processability of polymer composite materials or to increase hardness too much.

In the approach (4), as disclosed in Examined Japanese Patent Application Publication No. 63-14017, an alkali metal salt (i.e., an electrolyte) such as lithium chloride and potassium chloride is kneaded into a polymer material so that the electric resistivity is reduced owing to the presence of a metal ion such as $Li^+$ and $K^+$. Because inorganic metal salts such as alkali metal salts have poor compatibility with resins, they are likely to aggregate in the resins, resulting in poor electric resistivity. If the kneading temperature is increased or the kneading time is lengthened for the purpose of dissolving the aggregations in the resin, the problem may arise that the resin or the inorganic metal salts are decomposed, which results in destruction of mechanical properties and surface appearance. When a metal salt having deliquescence, such as a Li salt, is used in a large amount, the resulting polymer composite material may have hygroscopicity. In this case, the problems may arise that the volume resistivity considerably varies upon variation in humidity and the surface of the molding becomes sticky due to deliquescing substances of the metal salts.

SUMMARY OF THE INVENTION

Accordingly, an object of the present invention is to provide a semiconductive member having an appropriate volume resistivity, the distribution of which is uniform and the humidity dependency of which is small, and resistant to repeated application of high voltage.

Another object of the present invention is to provide a developing roll, a charging roll, a transfer belt, and an image forming apparatus, each of which can produce high quality images for an extended period of time.

In the present specification, being semiconductive is equivalent to having a volume resistivity of from $10^7$ to $10^{11}$ Ω·m.

These and other objects of the present invention, either individually or in combinations thereof, as hereinafter will become more readily apparent can be attained by a semiconductive member, comprising an alkali metal salt having the following formula (1) in a surface layer thereof:

$$(M)_n.X \quad (1)$$

wherein:

M represents a member selected from the group consisting of $Na^+$, $K^+$, and $Li^+$;

X represents a member selected from the group consisting of $Cl^-$, $Br^-$, $I^-$, $F^-$, $CH_3COO^-$, $CF_3COO^-$, $CH(COOH)CHCOO^-$, $(CHCOO^-)_2$, $CH_2(COOH)CH_2COO^-$, $(CH_2COO^-)_2$, $(HOOC)Ar(COO^-)$, $Ar(COO^-)_2$, $(HOOC)_2Ar(COO^-)$, $(HOOC)Ar(COO^-)_2$, $Ar(COO^-)_3$, $(HOOC)_3Ar\ (COO^-)$, $(HOOC)_2Ar(COO^-)_2$, $(HOOC)Ar(COO^-)_3$, $Ar(COO^-)_4$, $Ar—SO_3^-$, $Ar(SO_3^-)_2$, an oligomer or a polymer having an acrylic acid anion unit, and an oligomer or a polymer having an methacrylic acid anion unit;

Ar represents a member selected from the group consisting of a benzene ring, a naphthalene ring, and a biphenyl ring; and n is a numeral equivalent to the anionic valence of X; and a developing roll, a charging roll, a transfer belt, and an image forming apparatus using the semiconductive member.

BRIEF DESCRIPTION OF THE DRAWINGS

These and other objects, features and advantages of the present invention will become apparent upon consideration of the following description of the preferred embodiments of the present invention taken in conjunction with the accompanying drawings, wherein.

DETAILED DESCRIPTION OF THE INVENTION

Figure 1:
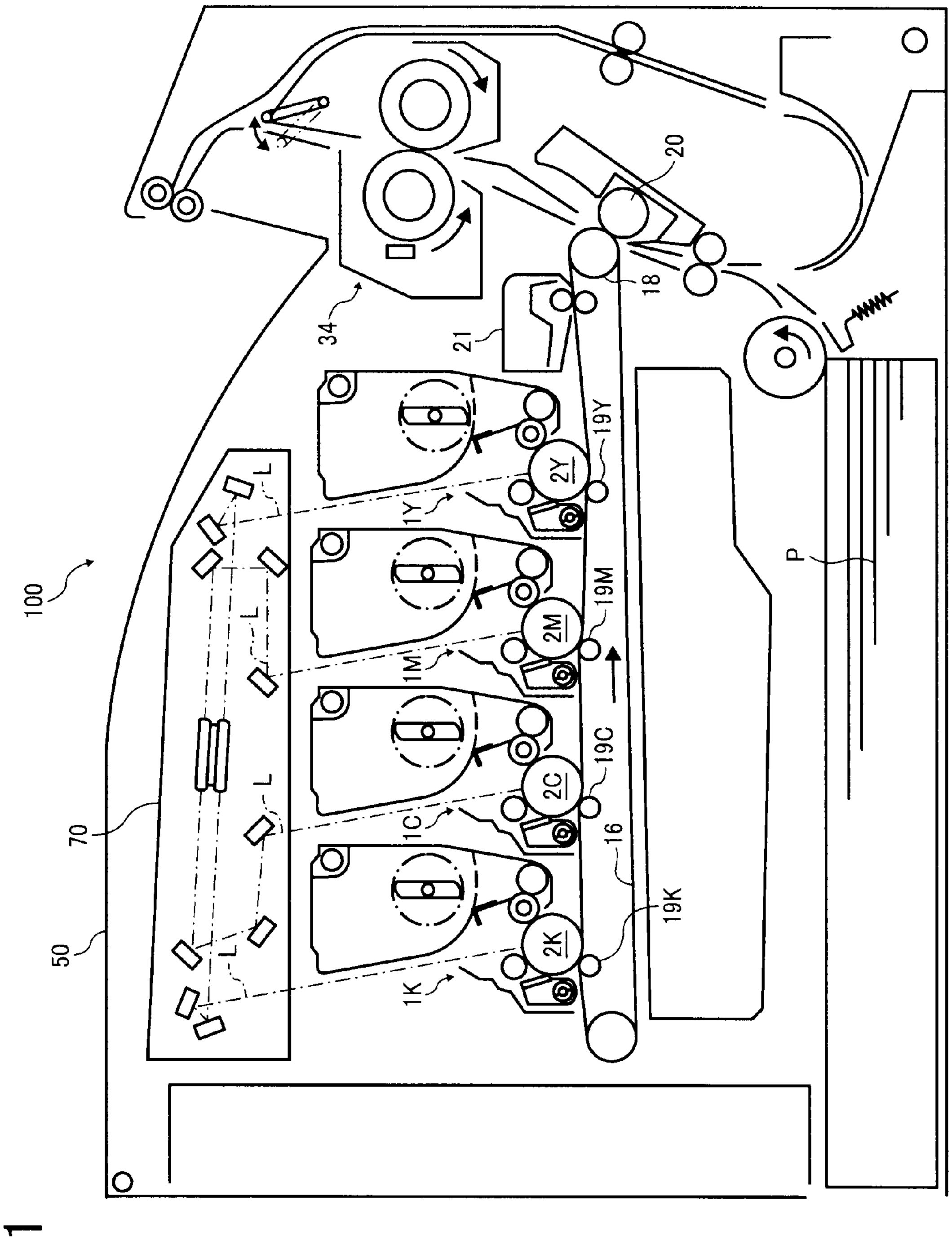
FIG. 1 is a schematic view illustrating an embodiment of a printer according to the present invention.

Generally, synthetic rubbers are used for various members. Among various synthetic rubbers, it is known that urethane rubbers and silicone rubbers have low hardness, abrasion resistance, and compression strain resistance, and are strong rubber-like elastic bodies. It has been considered that urethane rubbers are most suitable materials for a cover layer of a developing roll which is used for contact-developing devices in terms of strength and hardness. In a case in which a carbon black is dispersed in a urethane rubber to control the volume resistance of the urethane rubber, the problems may arise that the volume resistance is made uneven and the hardness is increased.

The resistance of a urethane rubber is controllable independently from hardness and strength by including an alkali metal salt having the following formula (1) therein. The resulting urethane rubber may provide a developing roll with a cover layer within which the resistance is even at any point. The resulting urethane rubber may also provide a charging roll for an electrostatic recording apparatus.

The formula (1) is as follows:

$$(M)_n.X \quad (1)$$

wherein:

M represents a member selected from the group consisting of $Na^+$, $K^+$, and $Li^+$;

X represents a member selected from the group consisting of $Cl^-$, $Br^-$, $I^-$, $F^-$, $CH_3COO^-$, $CF_3COO^-$, $CH(COOH)CHCOO^-$, $(CHCOO^-)_2$, $CH_2(COOH)CH_2COO^-$, $(CH_2COO^-)_2$, $(HOOC)Ar(COO^-)$, $Ar(COO^-)_2$, $(HOOC)_2Ar(COO^-)$, $(HOOC)Ar(COO^-)_2$, $Ar(COO^-)_3$, $(HOOC)_3Ar\ (COO^-)$, $(HOOC)_2Ar(COO^-)_2$, $(HOOC)Ar(COO^-)_3$, $Ar(COO^-)_4$, $Ar—SO_3^-$, $Ar(SO_3^-)_2$, an oligomer or a polymer having an acrylic acid anion unit, and an oligomer or a polymer having an methacrylic acid anion unit;

Ar represents a member selected from the group consisting of a benzene ring, a naphthalene ring, and a biphenyl ring; and n is a numeral equivalent to the anionic valence of X.

The above acrylic acid anion unit and methacrylic acid anion unit are defined as anionic species which are generated by disassociation of monomer-originated units at the time of polymerization of monomers such as sodium acrylate, sodium methacrylate, potassium acrylate, and potassium methacrylate. Oligomers and polymers of the anionic species can be prepared by typical radical polymerization methods. Alternatively, acrylic acid unit or methacrylic acid unit can be converted into anionic species by neutralization.

Preferably, in the formula (1), M is $Na^+$, $K^+$, or $Li^+$ and X is $Cl^-$, $Br^-$, $I^-$, or $F^-$.

When an excessive amount of an alkali metal salt is included in a rubber, it is likely that crystallization undergoes inside or on the surface of the rubber, which may disadvantageously contaminate other members without expressing desired properties.

It is preferable that the alkali metal salt includes both sodium (Na) and chlorine (Cl), and the detected intensity Na/C and Cl/C measured by energy dispersive X-ray analysis (at an accelerating voltage of 25 eV) are from 0.0008 to 0.07 and from 0.0009 to 0.01, respectively.

When a roll is immersed in a solution of an alkali metal salt (i.e., a mixture liquid of an alkali metal salt with water or a water-soluble organic solvent such as an alcohol), or applying or spraying the solution an alkali metal to a roll, it is preferable that fine particles have been fixed on the surface of the roll.

Preferred solvents for the solution of an alkali metal salt include a mixture of water and a water-soluble organic solvent having a boiling point of 100° C. or less, which is easy to remove by drying. Specific preferred examples of such water-soluble organic solvents include, but are not limited to, methanol (having a boiling point of 65° C.), ethanol (having a boiling point of 78° C.), isopropyl alcohol (having a boiling point of 83° C.), acetone (having a boiling point of 56° C.), methyl ethyl ketone (having a boiling point of 80° C.), and tetrahydrofuran (having a boiling point of 66° C.).

Specific preferred examples of usable fine particles include, but are not limited to, organic particles such as fine particles of acrylic resins, polyester resins, and polyurethane resins; and inorganic particles such as fine particles of carbon black, silica, titania, and alumina. These materials can be used alone or in combination. Fine particles of a hybrid material between an inorganic material and an organic material, which are obtainable by, for example, coating the surfaces of fine particles of silica with a resin are also preferable.

In terms of affinity for rubbers, fine particles of carbon blacks are preferable. It is more preferable that the fine particles have an alkali metal salt of a carboxylic acid or a sulfonic acid on the surface thereof.

The fine particles preferably have an average particle diameter of from 0.05 to 1.0 μm. The average particle diameter can be measured by a typical SEM observation or light scattering or diffraction using laser light.

An exemplary method of manufacturing a developing roll is described below.

A conductive elastic layer, preferably made of a conductive urethane elastic body, is formed on the surface of a core shaft. The surface of the elastic layer is treated with a surface treatment solution described later. The core shaft may be made of, for example, a metal, a resin, or a hybrid material between a metal and a resin, which are sustainable as a developing roll. The conductive urethane elastic body is obtained from a reaction of a mixture including at least one of a polyether polyol and a polyester polyol, with an isocyanate. The mixture may optionally include a catalyst and/or an auxiliary agent which are generally used for manufacturing polyisocyanates and polyurethanes, and/or an additive for controlling conductivity. The mixture is heated to room temperature or above so that a urethane reaction proceeds to obtain the conductive urethane elastic body.

Specific examples of usable polyether polyols include, but are not limited to, polyalkylene glycols (e.g., polyethylene glycol, polypropylene glycol, poly(propylene glycol-ethylene glycol), and mixtures thereof), polytetramethylene ether glycol, copolymerized polyols of tetrahydrofuran and an alkylene oxide, denaturalized products thereof, and mixtures thereof.

Specific examples of usable polyester polyols include, but are not limited to, condensed polyester polyols obtained from a condensation of a dicarboxylic acid (e.g., adipic acid) with a polyol (e.g., ethylene glycol), lactone-based polyester polyols, polycarbonate polyols, and mixtures thereof.

Specific examples of usable polyisocyanates include, but are not limited to, diphenylmethane isocyanate, tolylene diisocyanate, naphthalene diisocyanate, tolidine diisocyanate, para-phenylene diisocyanate, isophorone diisocyanate, prepolymers and denaturalized products thereof, and mixtures thereof.

Specific examples of usable auxiliary agents include, but are not limited to, chain extenders and cross-linkers, such as glycols, hexanetriol, trimethylolpropane, and amines.

Exemplary embodiments of the conductive urethane elastic body include, but are not limited to, electronically-conductive polyurethane rubbers to which at least one conductive carbon black is mixed; ion conductive polyurethane rubbers in which at least one ion conductive agent such as lithium perchlorate is mixed; and hybrid conductive polyurethane rubbers with which both electronic and ionic conductivities are provided.

Further, the mixture for preparing the conductive urethane elastic body may optionally include a compound having a siloxane bond. Specific examples of usable compounds having a siloxane bond include, but are not limited to, compounds having a dimethylsiloxane bond, such as isocyanate compounds having a dimethylsiloxane bond and polyols having a dimethylsiloxane bond. Specific examples of commercially available compounds having a siloxane bond include, but are not limited to, SF8427 and F8428 both from Dow Corning Toray Co., Ltd.

The above-described materials are sufficiently mixed using a mixing apparatus, and formed into an elastic layer on the surface of the core shaft by a typical method such as a one-shot method and a prepolymer method. The resultant elastic layer preferably has a JIS-A hardness of 55°, and more preferably from 25 to 55°. When the JIS-A hardness is too large, it is difficult to adjust the axis of the resultant developing roll so that the surface thereof evenly contact a photoreceptor.

The surface of the elastic layer is treated with a surface treatment solution including a polyisocyanate. The surface treatment solution includes a polyisocyanate including 10 to 70% by weight of dimethylsiloxane bonds. Specific preferred examples of suitable polyisocyanates include, but are not limited to, a polyisocyanate having terminal isocyanate groups, between which 10 to 70% by weight of dimethylsiloxane bonds exist with or without the presence of other bonds. When the amount of dimethylsiloxane bonds is too small, it is likely that the resulting elastic layer contaminates a photoreceptor. When the amount of dimethylsiloxane bond is too large, the friction coefficient of the surface of the resulting developing roll may be so large that the surface is likely to be abraded.

The polyisocyanate may be prepared by a typical method, for example, a method including preparing a mixture of a dimethyl polysiloxane, optionally along with a polyol, with a diisocyanate or triisocyanate in an amount of or greater than the equivalent weight, and heating the mixture.

The polyisocyanate thus prepared is preferably added to and mixed with an organic solvent to prepare the surface treatment solution. Specific examples of usable organic solvents include, but are not limited to, aprotic polar solvents such as ethyl acetate, dimethylformamide, and mixtures thereof. It is preferable that the surface treatment solution is adjusted to have a viscosity of from 10 to 500 cP by controlling the amount of the organic solvent. The surface treatment solution may include additives such as a compounding agent generally used for developing rolls and auxiliary agents generally used for polyurethane-forming reactions.

An exemplary method of surface-treating the conductive elastic layer includes immersing the elastic layer into the surface treatment solution and heating it. Another exemplary method includes applying the surface treatment solution to the surface of the elastic layer and heating it. In this case, the surface treatment solution may be applied by a spray coating method or a roll coating method, for example.

Preferably, the hardness of the urethane elastic layer is made high by the surface treatment. For example, when a JIS-A hardness is 70° or more, a photoreceptor may be more effectively prevented from contamination. It is preferable that the surface treatment solution permeates to the depth of about 1 mm from the outermost surface.

More specifically, in a case in which the elastic layer is immersed in the surface treatment solution, the surface treatment solution is preferably set to a temperature of from 10 to 40° C., and more preferably from 15 to 25° C. The immersion time is preferably 10 minutes or less, more preferably 5 minutes or less, and most preferably from 2 seconds to 3 minutes. Outside the above range, disadvantageously, the resulting surface-treated layer may have adhesion properties or is likely to crack.

The arithmetic average surface roughness (Ra) of the developing roll is preferably from 0.20 to 2.0 μm or less. When the arithmetic average surface roughness (Ra) is too large, in other words, the surface of the developing roll is too rough, the developing roll may friction and charge toner particles so unevenly that the resulting images may be uneven in density and may have fog. Additionally, the developing roll preferably has a volume resistance of from $8\times10^4$ to $1\times10^8\Omega$ to produce high quality images.

According to the present invention, a developing roll which can effectively prevent contamination of photoreceptors can be obtained by a very simple method such that a surface treatment solution is immersed in or applied to the surface of an elastic layer and heating it.

It is preferable that the surface of the elastic layer is surface-treated by immersing and hardening an isocyanate compound, as described above. The surface treatment solution may be an organic solvent in which an isocyanate compound is dissolved, for example. Optionally, a carbon black may be further added to the surface treatment solution. Alternatively, the surface treatment solution includes one or both of an acrylic fluorine-based polymer and an acrylic silicone-based polymer, a conductivity imparting agent, and an isocyanate compound.

In a case in which the surface of the elastic layer is treated with the surface treatment solution including an isocyanate, the resulting developing roll may have predetermined surface profile, friction coefficient, and electric resistance. When the elastic layer is electronically conductive or both electronically and ionically conductive (i.e., being hybrid) and carbon blacks exist in the surface-treated region of the elastic layer, the structures of the carbon black are cut. The degree of cutting of the carbon black structures descends from the surface toward the interior. Accordingly, the electric resistance gradually decreases from the surface toward the interior within the surface-treated region, forming a resistive layer with resistance gradient (hereinafter "a resistance gradient layer"). The electric resistance of the developing layer may be controlled by the amount of carbon black or the degree of resistance gradient of the resistance gradient layer.

In the above case in which the resistance gradient layer is formed by the surface treatment, the elastic layer includes a conductive carbon black rather than a carbon black generally used as a filler. The use of conductive carbon blacks has been avoided so far because variation in amount of conductive carbon black causes considerable variation in electric resistance. The resistance gradient layer, which is formed by cutting the structures of conductive carbon blacks in the surface-treated region of a conductive polyurethane elastic layer, has achieved provision of reliable electric resistance. Of course, the elastic layer may include a normal carbon black in combination with a conductive carbon black. It is preferable that a conductive carbon black to be added in the elastic layer can be evenly dispersed in a polyol, which is a raw material of polyurethanes, with an average particle diameter of 20 μm or less.

It depends on the desired electric resistance, however, the elastic layer preferably includes a carbon black in an amount of from 8 parts by weight or less based on 100 parts by weight of an ether polyol. When the amount of carbon black is too large, it is difficult to form a layer.

The compression set (determined based on JIS K6262) of the elastic layer is preferably 5% or less. When the compression set is too large, charge amount may vary.

The developing roll prepared as above is then immersed in a solution of an alkali metal salt. Alternatively, a solution of an alkali metal salt is applied to or sprayed on the developing roll. Thus, a surface layer including an alkali metal salt is formed on the surface of the developing roll.

When the following conditions (1) to (4) are satisfied, the resulting developing roll may reliably express desired function.

(1) The alkali metal salt includes both sodium (Na) and chlorine (Cl), and the detected intensity Na/C and Cl/C measured by energy dispersive X-ray analysis are from 0.0008 to 0.07 and from 0.0009 to 0.01, respectively.

(2) Fine particles having an average particle diameter of from 0.05 to 1.0 μm have been fixed on a surface of the roll.

(3) The fine particles are carbon blacks.

(4) The carbon black includes at least one of an alkali metal salt of a carboxylic acid and an alkali metal salt of a sulfonic acid on a surface thereof.

To achieve (4), one proposed approach involves chemically treating a surface of a carbon black to form an alkali metal salt of a carboxylic acid or an alkali metal salt of a sulfonic acid, and another approach involves using an alkali metal salt of a carboxylic acid or an alkali metal salt of a sulfonic acid as a dispersing agent for dispersing a carbon black.

Next, a laser printer which is used in the following Examples and Comparative Examples is described in detail with reference to the accompanying drawings.

Figure 2:
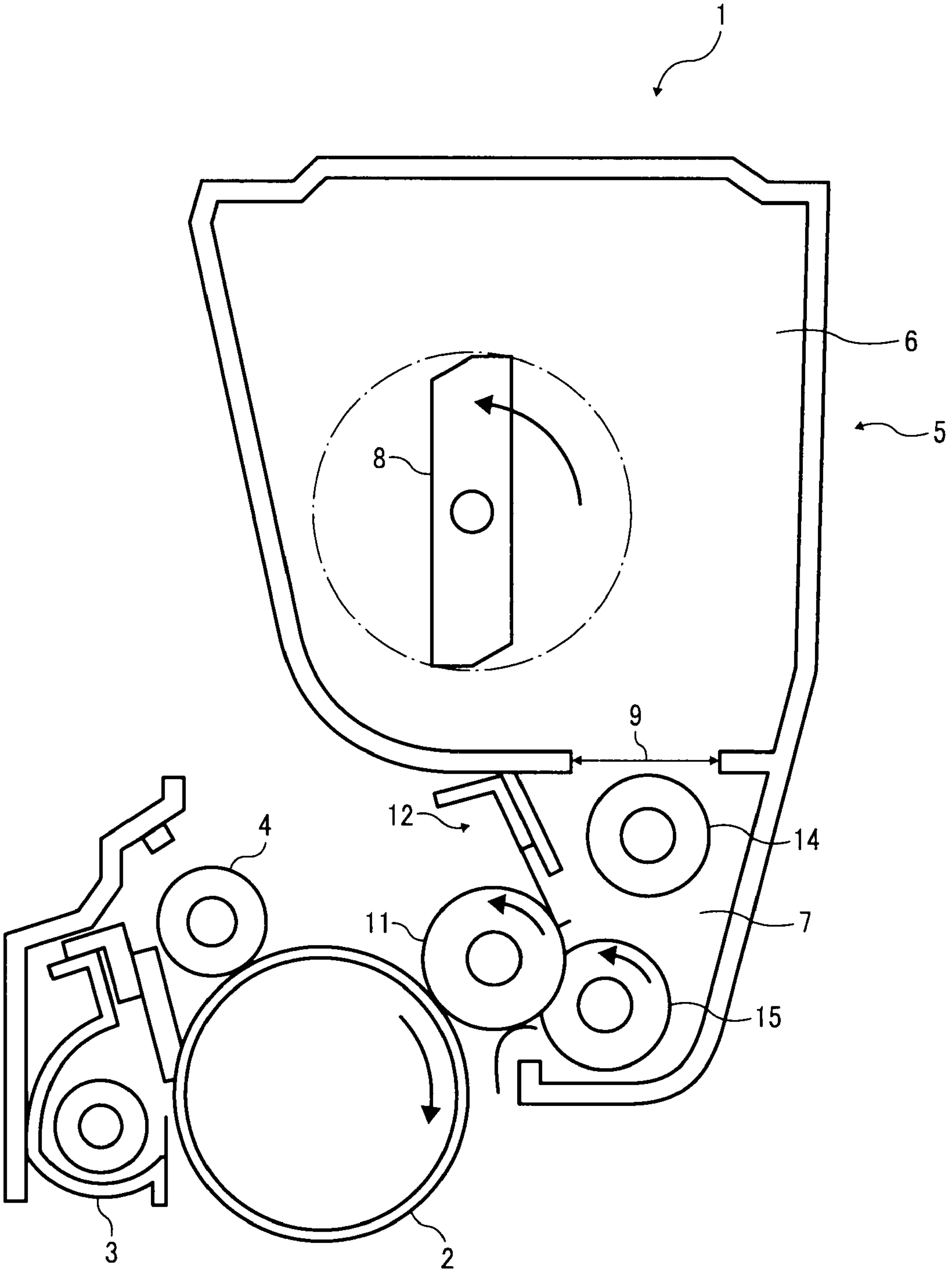
FIG. 2 is a schematic view illustrating an embodiment of the process unit in the printer illustrated in FIG. 1.

FIG. 1 is a schematic view illustrating an embodiment of a printer 100. The printer 100 includes four process units 1Y, 1M, 1C, and 1K which have the same configuration except for containing different-color toners of yellow, magenta, cyan, and black, respectively. Each of the process units may be independently replaced when reaching the lifespan. FIG. 2 is a schematic view illustrating an embodiment of the process unit 1 in the printer 100. The additional characters Y, M, C, and K representing toner colors of yellow, magenta, cyan, and black, respectively, are hereinafter added or omitted as appropriate.

Referring to FIG. 2, the process unit 1 includes a photoreceptor 2 serving as a latent image bearing member, a photoreceptor cleaning device 3, a neutralization device, not shown, a charging roll 4, and a developing device 5. The process unit 1 is detachably attachable to the printer 100. The process unit 1 is replaceable by releasing a stopper that is configured to prevent unexpected dropping off of the process unit 1.

The photoreceptor 2 is driven to rotate clockwise at a linear speed of 150 mm/sec by a driving mechanism to be described later. The charging roll 4 is pressed against the photoreceptor 2 and is driven to rotate by the rotation of the photoreceptor 2. A high voltage is applied to the charging roll 4 from a high-voltage power circuit, not shown, so that the surface of the photoreceptor 2 is charged to a potential of −500 V.

Referring to FIG. 1, an optical writing unit 70 serving as an irradiator irradiates the photoreceptors 2Y, 2M, 2C, and 2K with light L containing image information so that an electrostatic latent image is formed thereon. The optical writing unit 70 may be a laser beam scanning using a laser diode or an LED, for example.

Referring back to FIG. 2, the developing device 5 is a one-component contact developing device. The developing device 5 includes a developing roll 11 serving as a developer bearing member. A predetermined developing bias is applied to the developing roll 11 from a high-voltage power source, not shown, so that the electrostatic latent image on the photoreceptor is formed into a toner image that is visible. The toner image is then transferred onto an intermediate transfer belt 16, as illustrated in FIG. 1. The photoreceptor cleaning device 3 brings a cleaning brush or a cleaning belt into abrasive contact with a surface of the photoreceptor 2 so as to remove residual toner particles that remain on the surface of the photoreceptor 2 without being transferred onto the intermediate transfer belt 16.

The neutralization device, not shown, removes residual charges that remain on the surface of the photoreceptor 2 after the residual toner particles are removed therefrom. Thus, the surface of the photoreceptor 2 is initialized to prepare for a next image forming operation.

Referring back to FIG. 1, the process units 1Y, 1M, 10, and 1K are arranged in parallel with the direction of movement of the surface of the intermediate transfer belt 16. Yellow, cyan, magenta, and black toner images are formed in this order. A primary transfer bias is applied to primary transfer rolls 19Y, 19M, 19C, and 19K each so that the toner images are transferred from the surfaces of the photoreceptors 2Y, 2M, 2C, and 2K onto the surface of the intermediate transfer belt 16, respectively. The intermediate transfer belt 16 is driven by a driving motor, not shown, to move endlessly in a direction indicated by an arrow in FIG. 1. The yellow, cyan, magenta, and black toner images are successively transferred onto the surface of the intermediate transfer belt 16 and superimposed on one another, resulting in formation of a full-color toner image.

The full-color toner image formed on the intermediate transfer belt 16 is conveyed to a secondary transfer nip that is formed between a secondary transfer roll 20 and a secondary transfer facing roll 18. Upon application of a predetermined voltage to the secondary transfer roll 20, the full-color toner image is transferred onto a sheet of paper P (hereinafter simply "paper P") serving as a recoding medium. The paper P having the full-color toner image thereon is conveyed to a fixing device 34 so that the full-color toner image is fixed thereon. The paper P on which the full-color toner image is fixed is stacked on an upper cover 50 serving as a stack part.

Residual toner particles remaining on the intermediate transfer belt 16 without being transferred onto the paper P are collected by a transfer belt cleaning device 21.

Referring back to FIG. 2, the developing device 5 includes a vertically-long toner containing chamber 6 that contains a non-magnetic one-component developer, i.e., a toner, and a toner supplying chamber 7 provided below the toner containing chamber 6. The developing roll 11 serving as a developer bearing member and a thin layer forming member 12 serving as a developer controlling member are provided below the toner supplying chamber 7. The thin layer forming member 12 is in contact with the developing roll 11. Further, a supplying roll 15 that supplies a developer to the developing roll 11 is provided in contact with the developing roll 11. The developing roll 11 is provided in contact with the photoreceptor 2 and a predetermined developing bias is applied from a high-voltage power source, not shown.

A toner agitation member 8 is provided within the toner containing chamber 6. The toner agitation member 8 rotates counterclockwise so that the toner contained in the toner containing chamber 6 flows and falls down to the toner supplying chamber 7 through an opening 9. The opening 9, a partition that separates the toner containing chamber 6 and the toner supplying chamber 7, and a toner guide member 14 that guides the toner which has passed the opening 9 are provided above the supplying roll 15. The closest distance between the toner guide member 14 and the supplying roll 15 is preferably greater than 0 mm and less than 5 mm.

The surface of the supplying roll 15 is covered with a foamed material having voids (cells), so that the toner which has been conveyed to the toner supplying chamber 7 is effectively adhered to the supplying roll 15 and is prevented from deteriorating due to pressure concentration at the contact point of the supplying roll 15 with the developing roll 11. The foamed material preferably has an electric resistance of from $1\times10^3$ to $1\times10^{14}\Omega$.

The supplying roll 15 is applied with a supplying bias which has offset in the same direction and the same amount as the charge polarity of the toner relative to the developing bias. The supplying bias acts in a direction such that toner particles which are preliminarily charged at the contact point of the supplying roll 15 with the developing roll 11 are pressed against the developing roll 11.

The direction of offset is not limited to as described above. Depending on the kind of toner, the offset value may be 0 or the offset direction may be opposite.

The supplying roll 15 rotates counterclockwise. Toner particles adhered to the supplying roll 15 are supplied to the surface of the developing roll 11. The developing roll 11 is comprised of a roll which is covered with an elastic rubber layer. On the surface of the elastic rubber layer, a surface coating layer made of a material easily chargeable to the opposite polarity to the toner is further provided. The MD-1 hardness of the elastic rubber layer is set to 65° or less so that the elastic rubber layer is kept in even contact with the photoreceptor 2. The electric resistance of the elastic rubber layer is set to from $1\times10^4$ to $1\times10^{10}\Omega$ so that the developing bias acts thereon. The arithmetic average surface roughness (Ra) of the elastic rubber layer is set to from 0.2 to 2.0 μm so that toner particles are borne thereon. The developing roll 11 rotates counterclockwise to convey toner particles which are borne on the surface thereof to a position at which the developing roll 11 faces the thin layer forming member 12 and a position at which the developing roll 11 faces the photoreceptor 2.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Examples 1 to 15

Preparation of Roll

First, 100 parts of a polyether polyol, 3 parts of KETJEN BLACK EC (having an average particle diameter of about 0.1 μm, from Ketjen Black International K.K.), and 20 parts of diphenylmethane diisocyanate are mixed. The mixture is poured into a mold which has been preliminarily heated to 120° C. and in which a shaft has been set. The mixture is subjected to heating at 120° C. for 120 minutes. Thus, a roll comprising the shaft and a conductive polyurethane layer formed on the surface of the shaft, except for both ends, is prepared.

(Polishing of Roll)

The surface of the above-prepared roll is polished with a polishing stone to adjust the size. Subsequently, the roll is subjected to a wet polishing as described in FIG. 1 in Japanese Patent Application Publication No. 2004-341511 to reduce surface roughness in the circumferential direction.

(Preparation of Surface Treatment Solution 1)

To prepare a surface treatment solution, 100 parts of ethyl acetate, 20 parts of an isocyanate compound (MDI), and 5 parts of an acetylene black (DENKA BLACK FX-35 from Denki Kagaku Kogyo Kabushiki Kaisha) are mixed for 3 hours using a ball mill.

(Surface Treatment 1)

The roll is immersed in the surface treatment solution 1 at 20° C. for 30 seconds. Subsequently, the roll is heated for 10 hours in an oven set to 100° C.

(Surface Treatment 2)

The roll is immersed in each of the surface treatment solutions 2 described in Table 1 at 25° C., followed by drying. Thus, developing rolls 1 to 15 are prepared.

TABLE 1

| Surface | Additives | | Solvent Composition (% by weight)*[2] | | | | Immersion |
|---|---|---|---|---|---|---|---|
| Treatment Solution No. | Substance | Conc. (% by weight)*[1] | Ion-exchange Water | Ethyl Alcohol | Isopropyl Alcohol | Methyl Ethyl Ketone | Time (sec) |
| 2-1 | Sodium Chloride | 0.02 | 0 | 100 | 0 | 0 | 30 |
| 2-2 | Sodium Chloride | 0.08 | 5 | 95 | 0 | 0 | 30 |
| 2-3 | Sodium Chloride | 0.10 | 5 | 95 | 0 | 0 | 30 |
| 2-4 | Sodium Chloride | 0.10 | 10 | 90 | 0 | 0 | 30 |
| 2-5 | Sodium Chloride | 0.14 | 10 | 90 | 0 | 0 | 30 |
| 2-6 | Sodium Chloride | 0.14 | 20 | 0 | 80 | 0 | 30 |
| 2-7 | Sodium Chloride | 0.14 | 10 | 85 | 0 | 5 | 30 |
| 2-8 | Sodium Chloride | 0.14 | 15 | 80 | 5 | 0 | 30 |
| 2-9 | Sodium Chloride | 0.40 | 30 | 70 | 0 | 0 | 2 |
| 2-10 | Sodium Chloride | 0.40 | 40 | 0 | 60 | 0 | 2 |
| 2-11 | Sodium Acetate | 0.14 | 10 | 90 | 0 | 0 | 30 |
| 2-12 | Sodium Succinate | 0.20 | 10 | 90 | 0 | 0 | 30 |
| 2-13 | Disodium Succinate | 0.10 | 15 | 85 | 0 | 0 | 30 |
| 2-14 | Sodium Phthalate | 0.20 | 15 | 80 | 0 | 5 | 30 |
| 2-15 | Potassium Chloride/ Sodium Acetate | 0.06/0.10 | 15 | 80 | 5 | 0 | 30 |

*[1]based on total weight of surface treatment solution
*[2]based on total weight of solvents The developing rolls 1 to 15 are mounted on the laser printer illustrated in FIG. 1 which employs a non-magnetic one-component developing method.

Specifically, each of the developing rolls 1 to 15 is mounted on the developing device 5 illustrated in FIG. 2. A running test in which 5,000 sheets of an image are continuously produced is performed either under a high-temperature and high-humidity condition at 30° C. and 80% RH and a low-temperature and low-humidity condition at 10° C. and 15% RH. After the running test, the conveyance amount and charge amount of toner are evaluated (hereinafter "Evaluation 1" and "Evaluation 2", respectively). The stability of the resultant image density is also evaluated (hereinafter "Evaluation 3"). Comprehensive evaluation is performed based on the above evaluation results.

In the developing device 5, the outer diameter of the developing roll is set to 12 mm. The arithmetic average surface roughness (Ra) of the developing roll is set to 0.2 to 2.0 μm. The thin layer forming member 12 is pressed against the developing roll at a linear pressure of from 50 to 75 N/m.

A non-magnetic one-component developer including a binder resin, a colorant, and a wax is contained in the developing device 5.

The evaluation results are shown in Table 2. In Table 2, the results of Evaluation 1 are graded as follows.

Good: The amount of toner conveyed on the developing roll through the running test is 7.5±2.5 $g/m^2$.

Poor: Outside the above range.

The results of Evaluation 2 are graded as follows.

Good: The charge amount of toner on the developing roll after the running test is 25±10 μC/g.

Poor: Outside the above range.

Evaluation 3 is performed by measuring the reflective density at 9 points on an A4-size half-tone image. The 9 points include combinations of 3 randomly-selected points within a main scanning direction and 3 randomly-selected points within a sub scanning direction. The results are graded as follows.

Good: A variation of the reflective density from the average reflective density is within 25% at all of the 9 points.

Average: A variation of the reflective density from the average reflective density is from 25 to 35% at all of the 9 points.

Poor: A variation of the reflective density from the average reflective density is 35% or more at one of the 9 points.

"Comprehensive Evaluation" is performed as follows.

Good: Both of the results of Evaluation 1 and Evaluation 2 are "good" and the result of Evaluation 3 is "good" or "average".

Poor: Both of the results of Evaluation 1 and Evaluation 2 are "good" but the result of Evaluation 3 is "poor", or one of the results of Evaluation 1 and Evaluation 2 is "poor".

Examples 16 to 19

The procedure in Example 1 is repeated except for replacing the acetylene black (DENKA BLACK FX-35 from Denki Kagaku Kogyo Kabushiki Kaisha) with the following compounds.

Example 16: a cross-linked particle of a polymethyl methacrylate (EPOSTAR MA1002 from Nippon Shokubai Co., Ltd.)

Example 17: a particle of a condensed product of benzoguanamine and formaldehyde (EPOSTAR MS from Nippon Shokubai Co., Ltd.)

Example 18: a particle of an amorphous silica (SEAHOSTAR KE-P10 from Nippon Shokubai Co., Ltd.)

Example 19: a self-dispersive carbon black (AQUA-BLACK 162 from Tokai Carbon Co., Ltd.)

Thus, developing rolls 16 to 19 are prepared.

Comparative Example 1

The procedure in Example 1 is repeated except that the "Surface Treatment 2" is not performed.

Comparative Example 2

The procedure in Comparative Example 1 is repeated except that the "Surface Treatment 1" is not performed.

TABLE 2

| | Evaluation 1 | Evaluation 2 | Evaluation 3 | Comprehensive Evaluation |
|---|---|---|---|---|
| Example 1 | Good | Good | Average | Good |
| Example 2 | Good | Good | Average | Good |
| Example 3 | Good | Good | Good | Good |
| Example 4 | Good | Good | Good | Good |
| Example 5 | Good | Good | Good | Good |
| Example 6 | Good | Good | Good | Good |
| Example 7 | Good | Good | Good | Good |
| Example 8 | Good | Good | Good | Good |
| Example 9 | Good | Good | Good | Good |
| Example 10 | Good | Good | Good | Good |
| Example 11 | Good | Good | Good | Good |
| Example 12 | Good | Good | Good | Good |
| Example 13 | Good | Good | Good | Good |
| Example 14 | Good | Good | Good | Good |
| Example 15 | Good | Good | Good | Good |
| Example 16 | Good | Good | Average | Good |
| Example 17 | Good | Good | Average | Good |
| Example 18 | Good | Good | Average | Good |
| Example 19 | Good | Good | Average | Good |
| Comparative Example 1 | Good | Good | Poor | Poor |
| Comparative Example 2 | Good | Poor | Good | Poor |

This document claims priority and contains subject matter related to Japanese Patent Application No. 2008-316796, filed on Dec. 12, 2008, the entire contents of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A developing roll for developing an electrostatic latent image into a toner image, comprising:

a core shaft; and a surface layer comprising a semiconductive member on a surface of the core shaft, the semiconductive member comprising an alkali metal salt having the following formula (1) in a surface layer thereof:

$$(M)_n.X \quad (1)$$

wherein:

M represents a member selected from the group consisting of $Na^+$, $K^+$, and $Li^+$;

X represents a member selected from the group consisting of $Cl^-$, $Br^-$, $I^-$, $F^-$, $CH_3COO^-$, $CF_3COO^-$, $CH(COOH)CHCOO^-$, $(CHCOO^-)_2$, $CH_2(COOH)CH_2COO^-$, $(CH_2COO^-)_2$, $(HOOC)Ar(COO^-)$, $Ar(COO^-)_2$, $(HOOC)_2Ar(COO^-)$, $(HOOC)Ar(COO^-)_2$, $Ar(COO^-)_3$, $(HOOC)_3Ar(COO^-)$, $(HOOC)_2Ar(COO^-)_2$, $(HOOC)Ar(COO^-)_3$, $Ar(COO^-)_4$, $Ar—SO_3^-$, $Ar(SO_3^-)_2$, an oligomer or a polymer having an acrylic acid anion unit, and an oligomer or a polymer having an methacrylic acid anion unit;

Ar represents a member selected from the group consisting of a benzene ring, a naphthalene ring, and a biphenyl ring;

n is a numeral equivalent to the anionic valence of X;

fine particles having an average particle diameter of from 0.05 to 1.0 μm are fixed on a surface of the developing roll;

the fine particles are fine particles of a carbon black; and the carbon black comprises at least one of an alkali metal salt of a carboxylic acid and an alkali metal salt of a sulfonic acid on a surface thereof.

2. The developing roll according to claim 1, manufactured by immersing a member in a solution of the alkali metal salt or applying a solution of the alkali metal salt to a member, followed by drying.

3. The developing roll according to claim 2, wherein the solution includes a solvent which is a mixture of water and a water-soluble organic solvent having a boiling point of 100° C. or less.

4. An image forming apparatus, comprising:

a photoreceptor for bearing an electrostatic latent image;

a charger for charging the photoreceptor, the charger comprising a charging roll;

an irradiator for irradiating the photoreceptor with light to form an electrostatic latent image thereon;

a developing device for developing the electrostatic latent image into a toner image, the developing device comprising a developing roll; and a transfer device for transferring the toner image from the photoreceptor, the transfer device comprising a transfer belt, wherein the developing roll comprises:

a core shaft; and a surface layer comprising a semiconductive member on a surface of the core shaft, the semiconductive member comprising an alkali metal salt having the following formula (1) in a surface layer thereof:

$$(M)_n.X \quad (1)$$

wherein:

M represents a member selected from the group consisting of $Na^+$, $K^+$, and $Li^+$;

X represents a member selected from the group consisting of $Cl^-$, $Br^-$, $I^-$, $F^-$, $CH_3COO^-$, $CF_3COO^-$, $CH(COOH)CHCOO^-$, $(CHCOO^-)_2$, $CH_2(COOH)CH_2COO^-$, $(CH_2COO^-)_2$, $(HOOC)Ar(COO^-)$, $Ar(COO^-)_2$, $(HOOC)_2Ar(COO^-)$, $(HOOC)Ar(COO^-)_2$, $Ar(COO^-)_3$, $(HOOC)_3Ar(COO^-)$, $(HOOC)_2Ar(COO^-)_2$, $(HOOC)Ar(COO^-)_3$, $Ar(COO^-)_4$, $Ar—SO_3^-$, $Ar(SO_3^-)_2$, an oligomer or a polymer having an acrylic acid anion unit, and an oligomer or a polymer having an methacrylic acid anion unit;

Ar represents a member selected from the group consisting of a benzene ring, a naphthalene ring, and a biphenyl ring;

n is a numeral equivalent to the anionic valence of X;

fine particles having an average particle diameter of from 0.05 to 1.0 μm are fixed on a surface of the developing roll;

the fine particles are fine particles of a carbon black; and the carbon black comprises at least one of an alkali metal salt of a carboxylic acid and an alkali metal salt of a sulfonic acid on a surface thereof.

* * * * *